United States Patent
Yanagi et al.

(10) Patent No.: US 7,702,022 B2
(45) Date of Patent: Apr. 20, 2010

(54) COMMUNICATION SYSTEM, TRANSMITTING DEVICE, RECEIVING DEVICE, AND COMMUNICATION DEVICE CAPABLE OF WIDEBAND COMMUNICATIONS VIA IMPULSES

(75) Inventors: Masahiro Yanagi, Shinagawa (JP); Shigemi Kurashima, Shinagawa (JP); Hideki Iwata, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 900 days.

(21) Appl. No.: 11/295,620

(22) Filed: Dec. 7, 2005

(65) Prior Publication Data

US 2006/0215772 A1  Sep. 28, 2006

(30) Foreign Application Priority Data

Mar. 22, 2005  (JP)  ............................. 2005-082141

(51) Int. Cl.
    *H04L 27/00*  (2006.01)
(52) U.S. Cl. .................................................... 375/259
(58) Field of Classification Search ................... 375/259
    See application file for complete search history.

(56) References Cited

U.S. PATENT DOCUMENTS

| | | | | |
|---|---|---|---|---|
| 7,133,646 B1* | 11/2006 | Miao | ............................. | 455/73 |
| 7,209,523 B1* | 4/2007 | Larrick et al. | ............... | 375/295 |
| 7,263,133 B1* | 8/2007 | Miao | ............................. | 375/267 |
| 7,403,508 B1* | 7/2008 | Miao | ............................. | 370/335 |
| 2005/0031021 A1* | 2/2005 | Baker et al. | ................. | 375/142 |

FOREIGN PATENT DOCUMENTS

| JP | 2003-101811 | 4/2003 |
|---|---|---|
| JP | 2003-169017 | 6/2003 |

OTHER PUBLICATIONS

Weihua Zhuang, Xuemin (Sherman) Shen, Qi Bi, "Ultra-wideband wireless communications," Wireless Communications and Mobile Computing, vol. 3, Issue 6, Date: Sep. 2003, pp. 663-685.*
D. L. Newman, S. J. Penney and S. E. Greenwald, "Pulse propagation characteristics by an impulse technique," Medical & Biological Engineering & Computing Jul. 1983, No. 21, pp. 515-517.*

* cited by examiner

*Primary Examiner*—David C Payne
*Assistant Examiner*—Nader Bolourchi

(57)  ABSTRACT

A communication system for transmitting and receiving a send data item is disclosed that comprises a transmitting device and a receiving device. The transmitting device includes a data generating unit to generate a data item by modulating the send data item, an impulse generating unit to generate an impulse corresponding to the generated data item, a transmitting channel selecting unit to allow a frequency component corresponding to a transmitting channel to pass through while the impulse attempts to pass therethrough, and a transmitting unit to transmit the impulse as a signal. The receiving device includes a receiving unit to receive the signal, a receiving channel selecting unit to allow the frequency component corresponding to the transmitting channel to pass through while the signal attempts to pass therethrough, and a data restoring unit to extract the impulse from the signal to restore the send data item according to the extracted impulse.

10 Claims, 12 Drawing Sheets

COMMUNICATION SYSTEM, TRANSMITTING DEVICE, RECEIVING DEVICE, AND COMMUNICATION DEVICE CAPABLE OF WIDEBAND COMMUNICATIONS VIA IMPULSES

BACKGROUND OF THE INVENTION

1. Field of the Invention

The present invention relates to a communication system, a transmitting device, a receiving device, and a communication device, and particularly relates to a communication system, a transmitting device, a receiving device, and a communication device that provide wideband communications.

2. Description of the Related Art

The type of transmission modules used in radio communications varies depending on frequency band. The frequency band is classified into, for example, the 27 MHz band and the 300 MHz band for weak radio communication methods, and the 2.4 GHz band and UWB (Ultra Wide Band) for specific low power communication methods.

Generally, a communication device that uses plural radio communication methods comprises plural transmission modules.

Patent Document 1, for example, discloses a communication device that transmits signals over UWB. Patent Document 2, for example, discloses a communication device that adjusts the frequency band by adjusting impulse widths.

[Patent Document 1] Japanese Patent Laid-Open Publication No. 2003-101811

[Patent Document 2] Japanese Patent Laid-Open Publication No. 2003-169017

The problems with the communication devices that use the plural radio communication methods are configuration complexity and size increase due to having the plural transmission modules.

SUMMARY OF THE INVENTION

The preset invention solves at least one problem described above. According to one aspect of the present invention, there are provided a communication system, a transmitting device, a receiving device, and a communication device, having simple construction.

According to another aspect of the present invention, there is provided a communication system for transmitting and receiving a send data item comprising a transmitting device and a receiving device. The transmitting device includes a data generating unit to generate a data item by modulating the send data item, an impulse generating unit to generate an impulse corresponding to the data item generated by the data generating unit, a transmitting channel selecting unit to allow a frequency component of the impulse generated by the impulse generating unit corresponding to one of transmitting channels to pass through while the impulse attempts to pass through the transmitting channel selecting unit, and a transmitting unit to transmit the impulse that has passed through the transmitting channel selecting unit as a signal. The receiving device includes a receiving unit to receive the signal transmitted from the transmitting unit, a receiving channel selecting unit to allow the frequency component of the received signal corresponding to said one of the transmitting channels to pass through while the received signal attempts to pass through the receiving channel selecting unit, and a data restoring unit to extract the impulse from the signal that has passed through the receiving channel selecting unit so as to restore the send data item in accordance with the extracted impulse.

It is preferable that the impulse generating unit generate the impulse at one of a rising edge and a falling edge of a pulse of the data item generated by the data generating unit.

The transmitting channel selecting unit may include plural filters corresponding to the transmitting channels, each of said filters being adapted to allow a frequency component corresponding to the respective transmitting channel to pass through, and a filter selecting unit to select one of the filters corresponding to said one of the transmitting channels.

The transmitting channel selecting unit may alternatively include a pass frequency variable filter capable of varying a pass frequency thereof, the pass frequency filter being controlled to allow the frequency component corresponding to said one of the transmitting channels to pass through the pass frequency variable filter.

The receiving channel selecting unit may include plural filters corresponding to the transmitting channels, each of said filters being adapted to allow a frequency component corresponding to the respective transmitting channel to pass through, and a filter selecting unit to select one of the filters corresponding to said one of the transmitting channels.

The receiving channel selecting unit may alternatively include a pass frequency variable filter capable of varying a pass frequency thereof, the pass frequency filter being controlled to allow the frequency component corresponding to said one of the transmitting channels to pass through the pass frequency variable filter.

According to the above described aspects of the present invention, the impulse corresponding to the data item generated by the data generating unit is generated, and the generated impulse is transmitted as a signal after the application of a filter that passes the frequency components of the impulse corresponding to the transmitting channel. In the receiving device, another filter that passes the frequency component corresponding to the transmitting channel is applied to the received signal. The impulse is then extracted from the signal after application of the filter so as to restore the send data item in accordance with the extracted impulse.

Since the filters allow only the frequency component having a frequency corresponding to a desired channel to pass therethrough while the impulse of a ultra wide band attempts to pass the filter, the communication system does not need to include oscillators for each of the transmitting frequencies. Therefore, the communication system can provide wideband communications while having a simple structure.

DETAILED DESCRIPTION OF THE PREFERRED EMBODIMENT

First Embodiment

System Configuration

Figure 1:
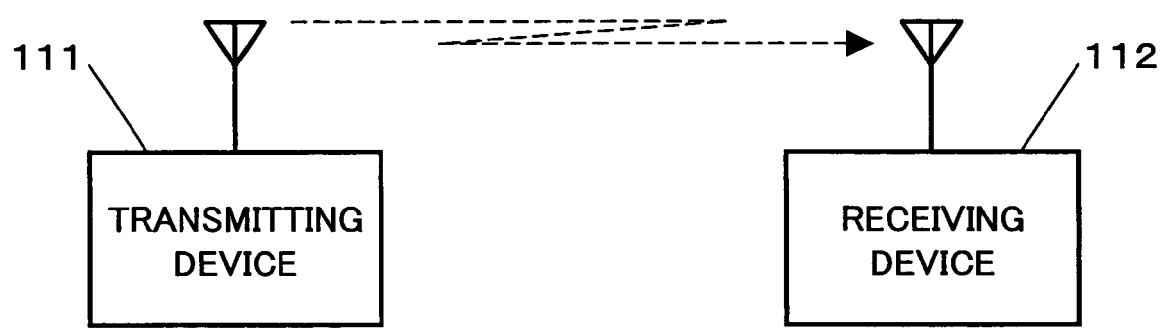
FIG. 1 is a schematic diagram showing a system configuration of a communication system according to one embodiment of the present invention.

FIG. 1 is a schematic diagram showing a system configuration of a communication system 100 according to a first embodiment of the present invention.

The communication system 100 of this embodiment comprises a transmitting device 111 and a receiving device 112. The transmitting device 111 transmits modulated data in the form of signals to the receiving device over UWB. The receiving device 112 receives the signals transmitted from the transmitting device 111 and restores the original data in accordance with the signals.

[Transmitting Device 111]

Figure 2:
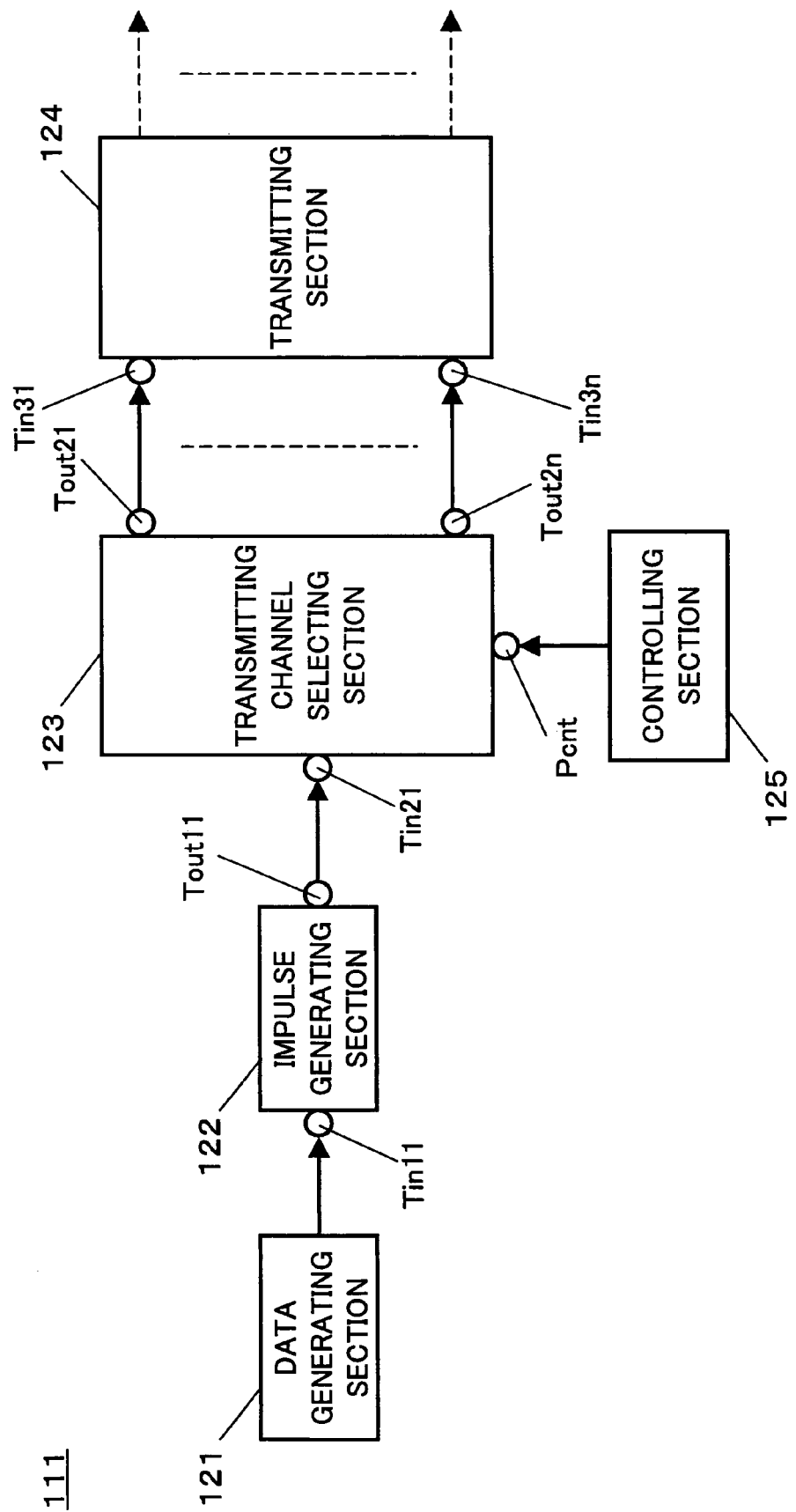
FIG. 2 is a block diagram showing a transmitting device.

FIG. 2 is a block diagram showing the transmitting device 111.

The transmitting device 111 is configured to convert the data item into impulses and transmit the impulses. The transmitting device 111 comprises a data generating section 121, an impulse generating section 122, a transmitting channel selecting section 123, a transmitting section 124, and a controlling section 125.

The data generating section 121 generates a data item by modulating a send data item to be transmitted to the receiving device 112. The data item generated by the data generating section 121 is sent to the impulse generating section 122.

[Impulse Generating Section 122]

Figure 3:
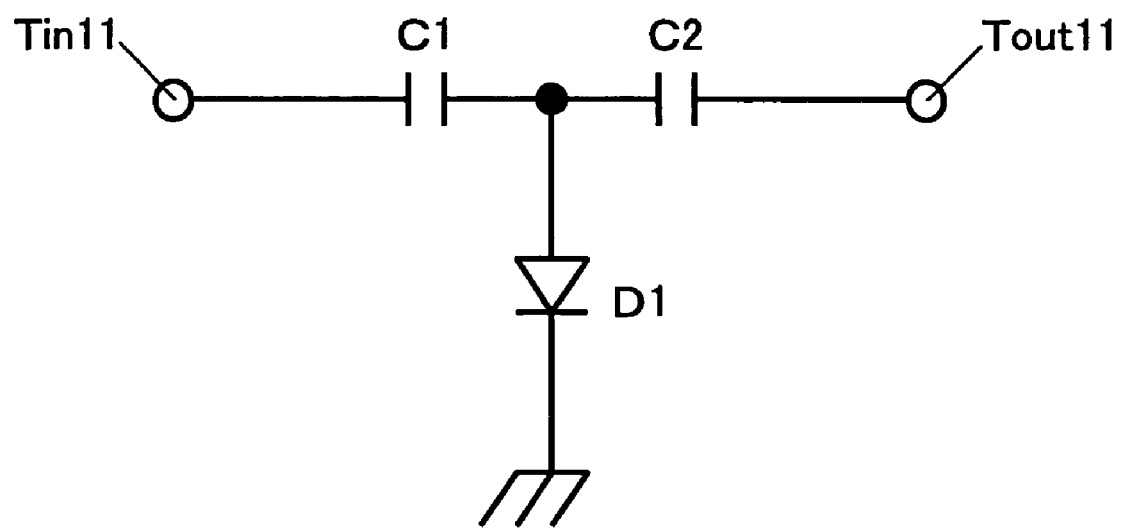
FIG. 3 is a circuit diagram showing an impulse generating section.

FIG. 3 illustrates a circuit diagram of the impulse generating section 122.

The impulse generating section 122 comprises capacitors C1 and C2, and a diode D1. The data item generated by the data generating section 121 is input from an input terminal Tin11. The input terminal Tin11 is connected to an output terminal Tout11 through the capacitors C1 and C2. The diode D1 has an anode connected to a connection point between the capacitor C1 and the capacitor C2, and a cathode connected to ground. The impulse generating section 122 generates impulses when the diode D1 is switched on at falling edges of the data item transmitted from the data generating section 121. The impulse generating section 122 generates no impulse when the diode D1 is switched off at rising edges of the data item. The impulse is output from the output terminal Tout11. The output terminal Tout11 of the impulse generating section 122 is connected to an input terminal Tin21 of the transmitting channel selecting section 123.

Although the impulses are generated at the falling edges of the data item in this embodiment, the impulses may be generated at the rising edges of the data item. In an alternative embodiment, the impulses may be generated at both the rising edges and the falling edges.

[Transmitting Channel Selecting Section 123]

Figure 4:
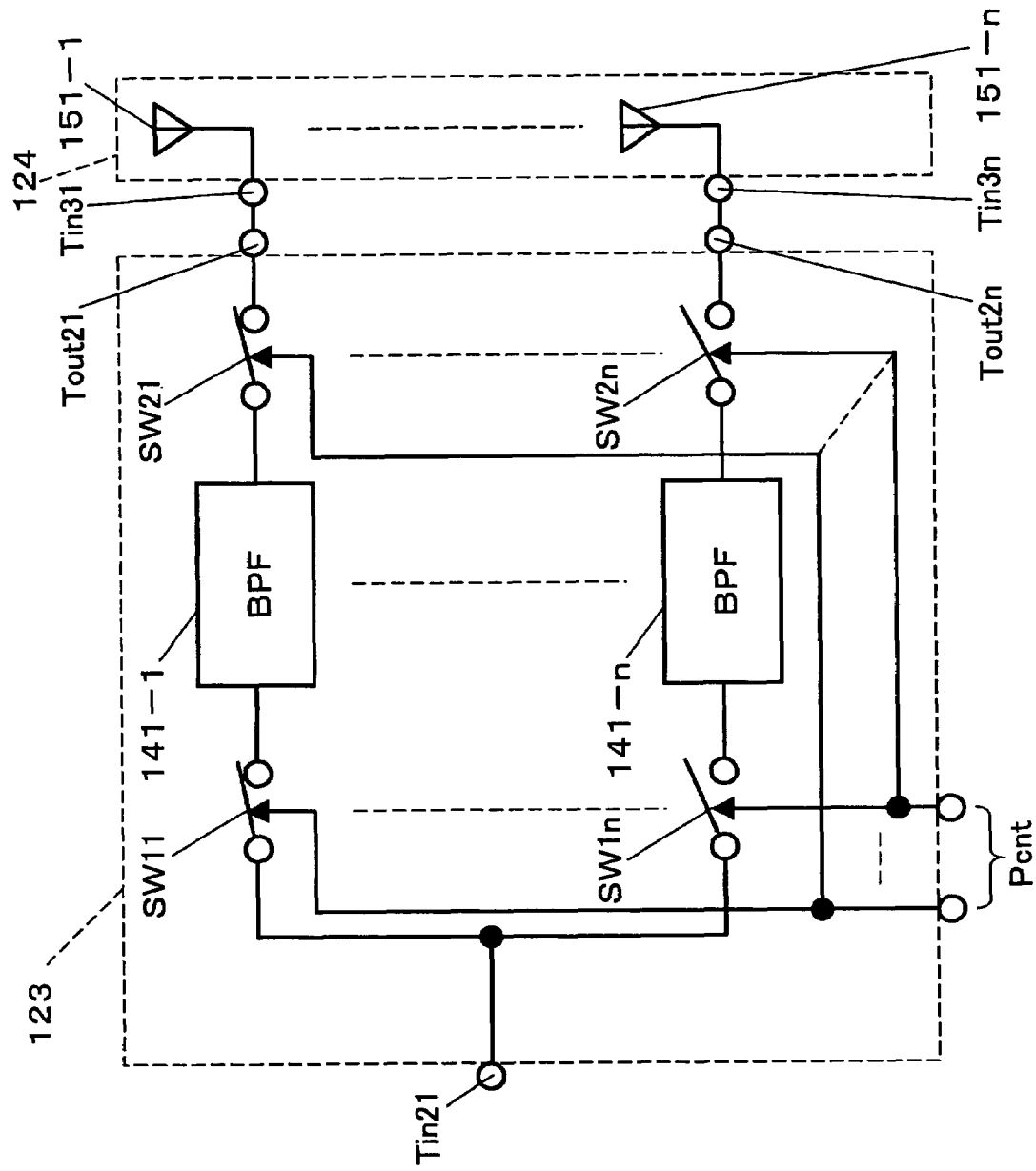
FIG. 4 is a block diagram showing a transmitting channel selecting section and a transmitting section.

FIG. 4 is a block diagram showing the transmitting channel selecting section 123 and the transmitting section 124.

The transmitting channel selecting section 123 comprises switches SW11-SW1$n$, switches SW21-SW2$n$, and bandpass filters 141-1-141-$n$. The transmitting channel selecting section 123 allows frequency components corresponding to a frequency band of a transmitting channel to pass therethrough while the impulses generated by the impulse generating section 122 attempts to pass the transmitting channel selecting section 123.

The switch SW1$i$ ($i$=1 through n) has an end connected to the input terminal Tin21 and the other end connected to the bandpass filter 141-$i$. The switches SW11-SW1$n$ are switched on/off in accordance with control signals sent to control ports Pcnt.

The bandpass filters 141-1-141-$n$ pass different ranges of frequency components. In other words, the bandpass filter 141-$i$ passes a range of frequency components within a frequency range of an i channel. The bandpass filters 141-1-141-$n$ may comprise a ring filter or a combination of low-pass and high-pass filters.

The impulses that have passed through the bandpass filters 141-$i$ is sent to an end of the corresponding switch SW2$i$ connected to the bandpass filter 141-$i$. The other end of the switch SW2$i$ is connected to an output terminal Tout2$i$. The switches SW21-SW2$n$ are switched on/off in accordance with control signals sent to the control ports Pcnt. The switch SW2$i$ is switched on/off in synchronization with the switch SW1$i$.

The control ports Pcnt are connected to the controlling section 125. The controlling section 125 sends the control signals corresponding to transmitting channels to the control ports Pcnt.

The output terminal Tout2$i$ of the transmitting channel selecting section 123 is connected to an input terminal Tin3$i$ of the transmitting section 124 such that the impulses that have passed through the transmitting channel selecting section 123 are sent to the transmitting section 124. The transmitting section 124, comprising antennas 151-1-151-$n$, radiates the impulses that have passed through the transmitting channel selecting section 123 into the air in the form of signals.

The receiving device 112 receives the signals radiated in the air.

Since the frequency band of the impulses generated by the impulse generating section 122 is very wide, the impulses may be transmitted as signals in various frequency bands by simply applying the bandpass filters 141-1-141-$n$ to the impulses.

[Receiving Device 112]

Figure 5:
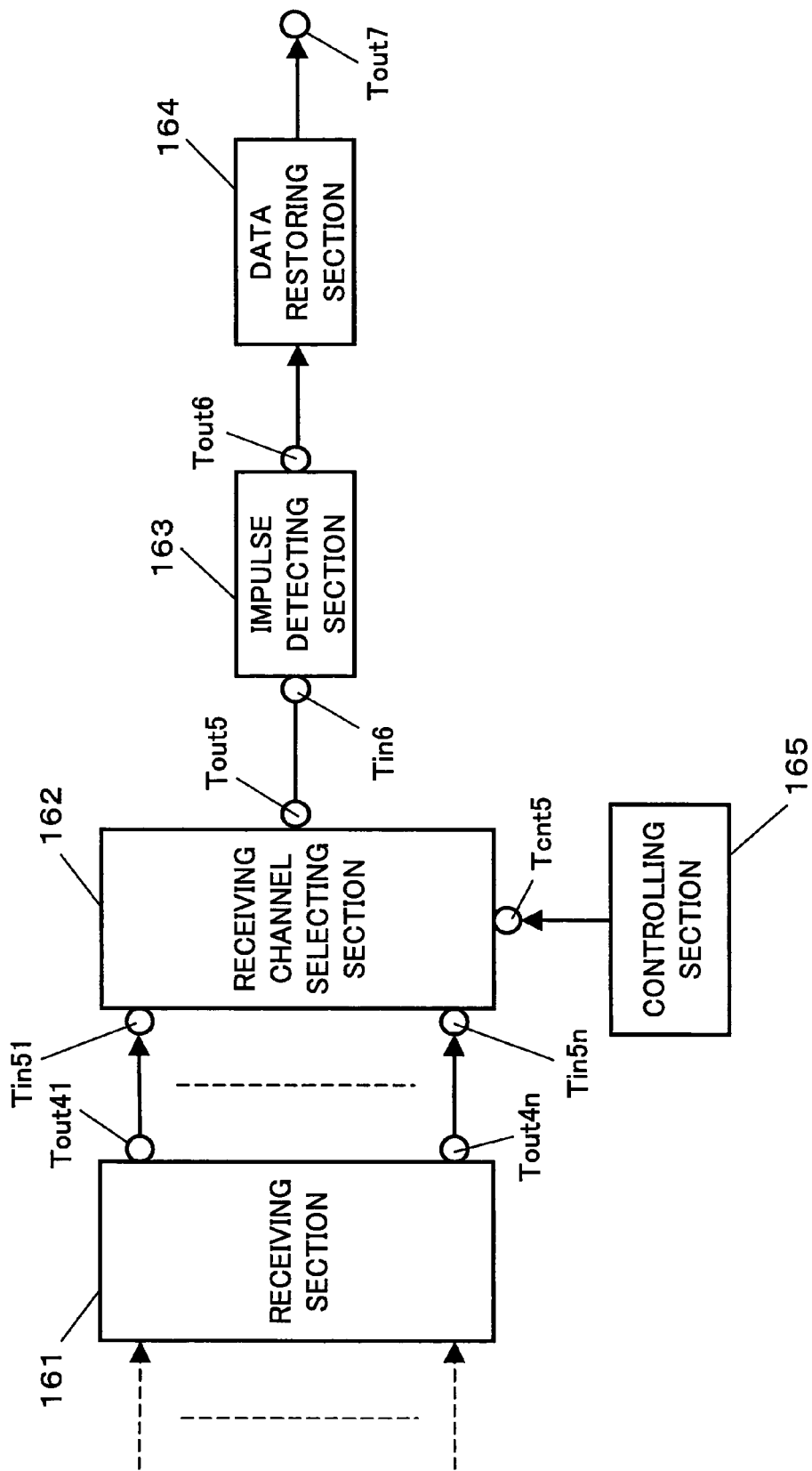
FIG. 5 is a block diagram showing a receiving device.

FIG. 5 is a block diagram showing the receiving device 112.

The receiving device 112 comprises a receiving section 161, a receiving channel selecting section 162, an impulse detecting section 163, a data restoring section 164, and a controlling section 165. The receiving device 112 restores the send data item in accordance with the impulses transmitted from the transmitting device 111.

Figure 6:
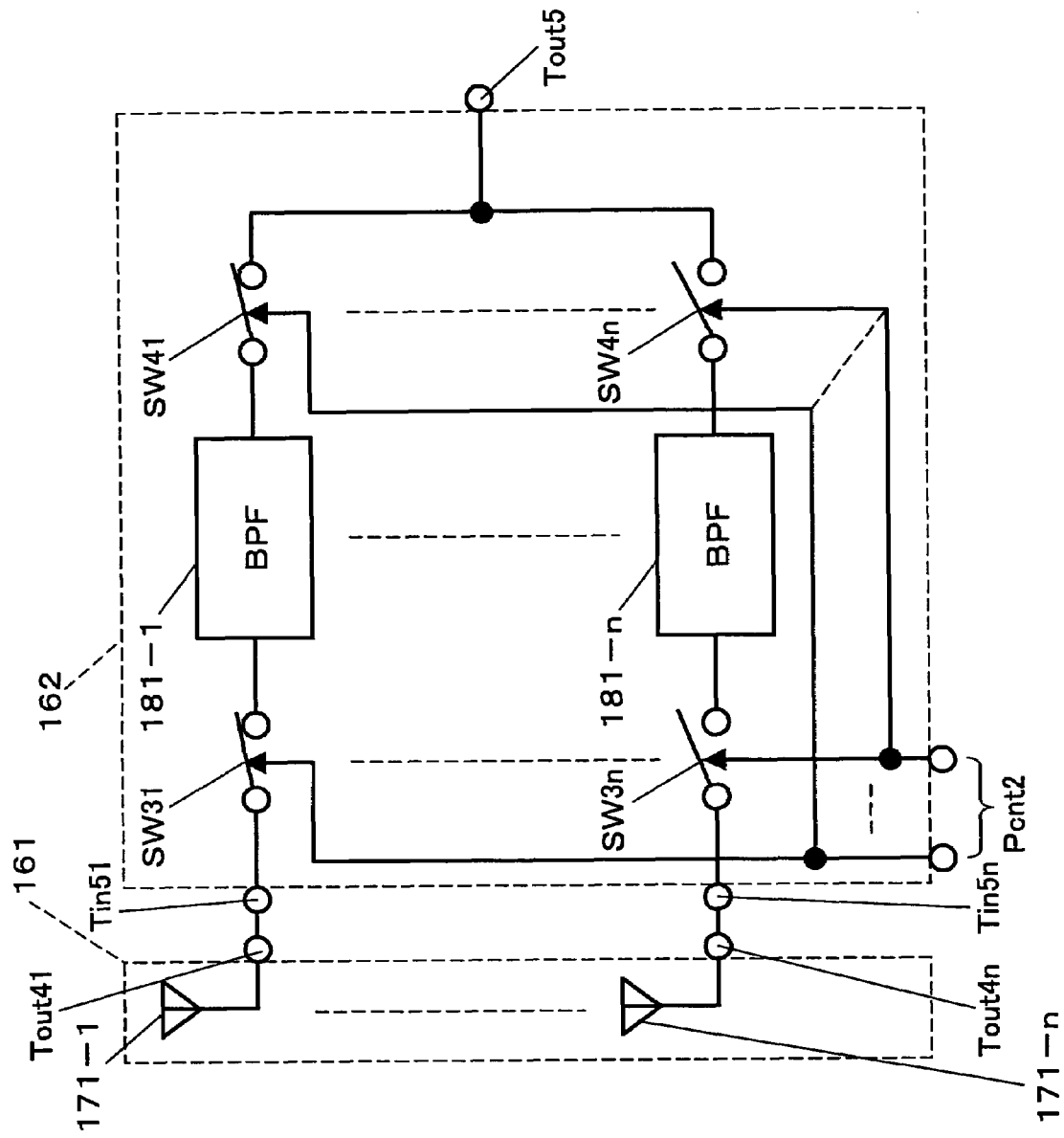
FIG. 6 is a block diagram showing a receiving section and a receiving channel selecting section.

FIG. 6 is a block diagram showing the receiving section 161 and the receiving channel selecting section 162.

The receiving section 161 comprises antennas 171-1-171-$n$. The antenna 171-$i$ ($i$=1 through n) is suitable for tuning the transmitted signals of the i-th channel. The signals received by the antenna 171-1-171-$n$ are output from output terminals Tout41-Tout4$n$, respectively. The signals output from the output terminals Tout 41-Tout4$n$ of the receiving section 161 are sent to input terminals Tin51-Tin5$n$ of the receiving channel selecting section 162 that are connected to the output terminals Tout 41-Tout4$n$, respectively.

The receiving channel selecting section 162 comprises switches SW31-SW3n, SW41-SW4n, and bandpass filters 181-1-181-n.

The switch SW3i has an end connected to the input terminal Tin5i, and the other end connected to the bandpass filter 181-i. The switches SW31-SW3n are connected to corresponding control ports Pcnt2 so as to be switched on/off in accordance with control signals sent to the control ports Pcnt2. The signals sent to the input terminal Tin5i are input to the bandpass filter 181-i when the switch SW3i is on. Each of the bandpass filters 181-1-181-n may comprise a ring filter or a combination of low-pass and high-pass filters.

The bandpass filter 181-i allows frequency components of the input signals within the frequency band of the i-th channel to pass through while the signals attempt to pass through the bandpass filter 181-i. The signals that have passed through the bandpass filter 181-i are sent to the switch SW4i. The switch SW4i has an end connected to the bandpass filter 181-i and the other end connected to an output terminal Tout5.

The switches SW41-SW4n are connected to the corresponding control ports Pcnt2 so as to be switched on/off in accordance with control signals sent to the control ports Pcnt2. The switch SW4i is switched on/off in synchronization with the switch SW3i. The signals output from the bandpass filter 181-i are sent to the output terminal Tout5 when the switch SW4i is on.

The output terminal Tout5 of the receiving channel selecting section 162 is connected to an input terminal Tin6 of the impulse detecting section 163.

Figure 7:
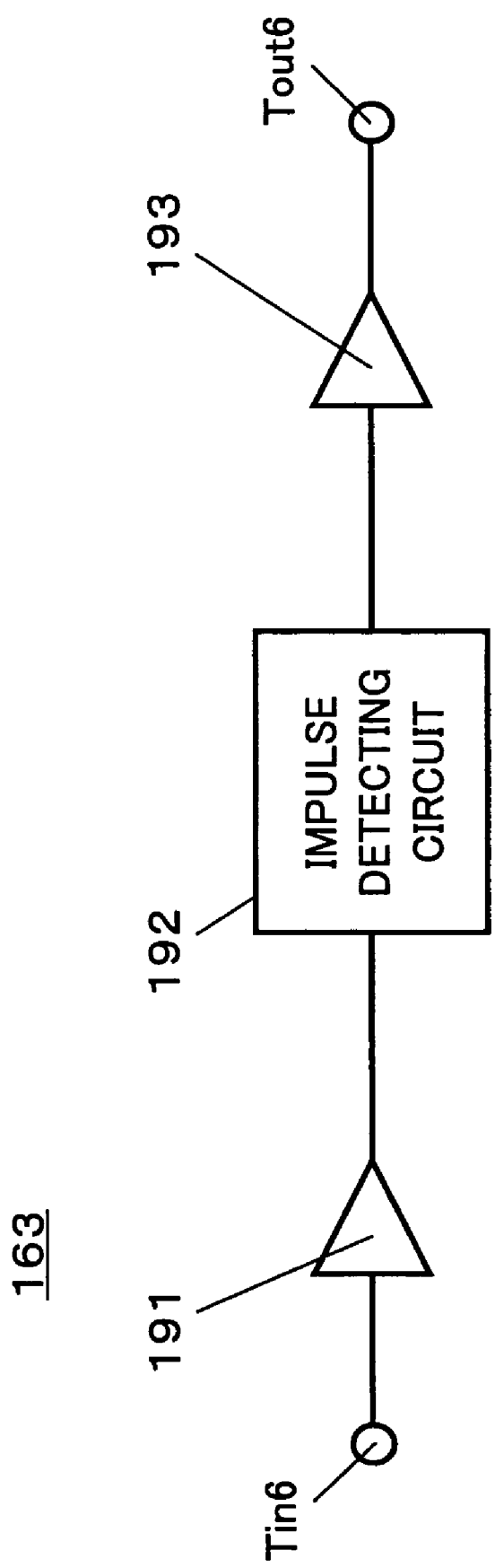
FIG. 7 is a block diagram showing an impulse detecting section.

FIG. 7 is a block diagram showing the impulse detecting section 163.

The impulse detecting section 163 comprises a low noise amplifier 191, an impulse detecting circuit 192, and a comparator 193.

The signals output from the receiving channel selecting section 162 are input through the input terminal Tin6 to the low noise amplifier 191. The low noise amplifier 191 amplifies the signals output from the receiving channel selecting section 162. The signals amplified by the low noise amplifier 191 are sent to the impulse detecting circuit 192. The impulse detecting circuit 192 detect impulses in the signals sent from the low noise amplifier 191. The impulses detected by the impulse detecting circuit 192 are sent to the comparator 193. The comparator 193 generates pulses that fall in response to the impulses and have predetermined pulse widths. The pulses generated by the comparator 193 are output through an output terminal Tout6 connected to the data restoring section 164. The data restoring section 164 restores the original send data item in accordance with the pulses generated by the impulse detecting section 163.

[Operations]

Figure 8:
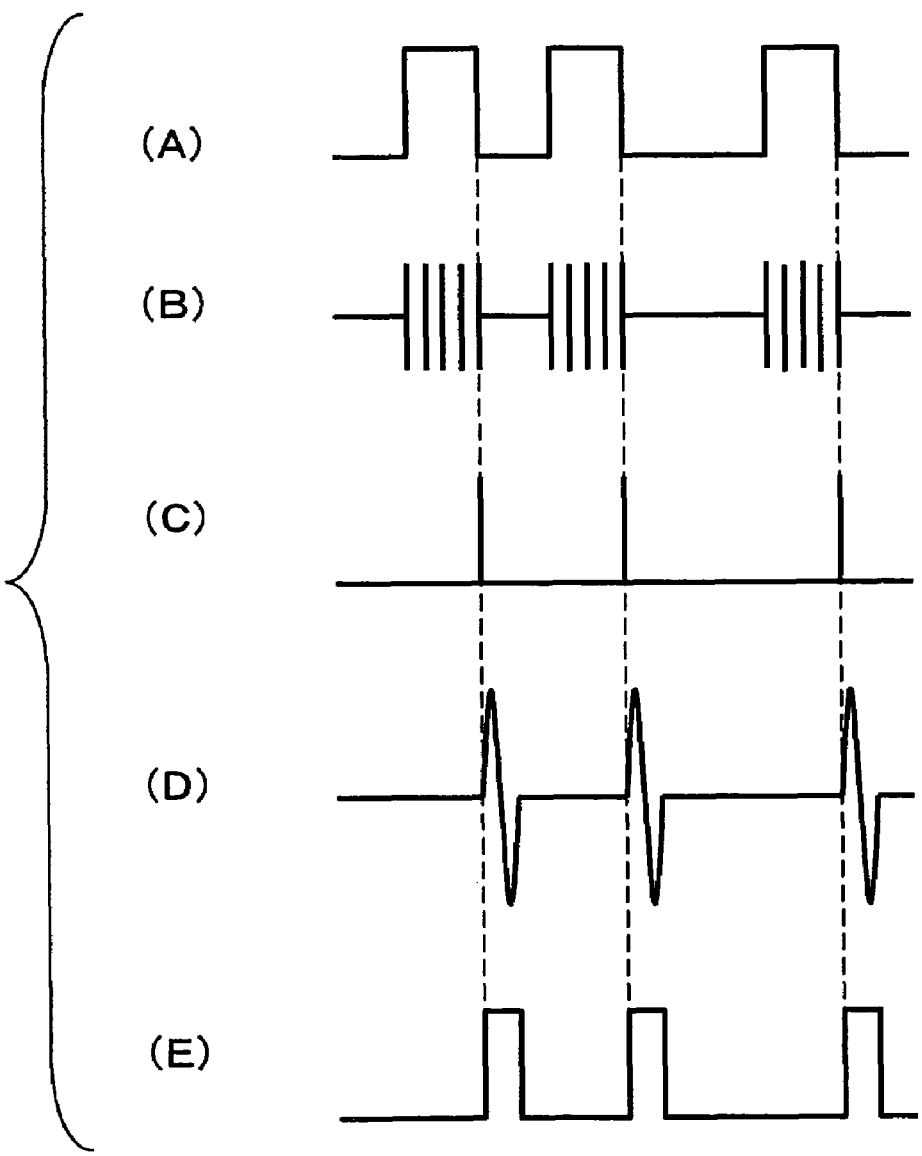
FIG. 8 is an operations chart of a first embodiment of the present invention.

FIG. 8 is an operations chart illustrating the first embodiment of the present invention, wherein (A) illustrates the data item generated by the data generating section 121, (B) illustrates a data item resulting from ASK modulation of the data item generated by the data generating section 121, (C) illustrates the impulses generated by the impulse generating section 122 of the transmitting device 111, (D) illustrates the impulses after the application of the bandpass filter 141-i of the transmitting device 111, and (E) illustrates the output from the impulse detecting section 163 of the receiving device 112.

The data generating section 121 generates the data item as shown in (A) by modulating the send data item, and further modulates the generated data item as shown in (B). Then, the impulse generating section 122 generates the impulses at the falling edges of the data item as shown in (C). The impulses generated by the impulse generating section 122 are sent to the bandpass filter 141-i of the transmitting channel selecting section 123 that allows the frequency components within the frequency band of the i channel to pass therethrough while the impulses attempt to pass through the bandpass filter 141-i. The impulses that have passed through the bandpass filter 141-i are transmitted in the form of signals as shown in (D), which have the frequency band of the i-th channel.

The receiving section 161 of the receiving device receives the transmitted signals shown in (D). In the receiving device 112, when the receiving channel selecting section 162 selects the i-th channel, the signals shown in (D) are sent to the bandpass filter 181-i that passes signals of the frequency band of the i-th channel. Since the signals shown in (D) are signals of the frequency band of the i-th channel, the bandpass filter 181-i passes the signals shown in (D) to the impulse detecting section 163. The impulse detecting section 163 detects the impulses in the signals shown in (D) to generate the pulses as shown in (E).

The data restoring section 164 detects the falling edges of the data item shown in (A) based on the pulses shown in (E) to restore the original send data item.

[Effects]

In the illustrated embodiment, the impulses may be generated at the rising edges or the falling edges of the data item. Further, signals having desired frequencies can be transmitted by the application of a filter corresponding to a desired frequency band. As the impulses are generated in this way, there is no need to provide an oscillator circuit. Therefore, the communication system 100 is applicable in various ranges of frequency bands while having a simple structure.

[First Modification]

Figure 9:
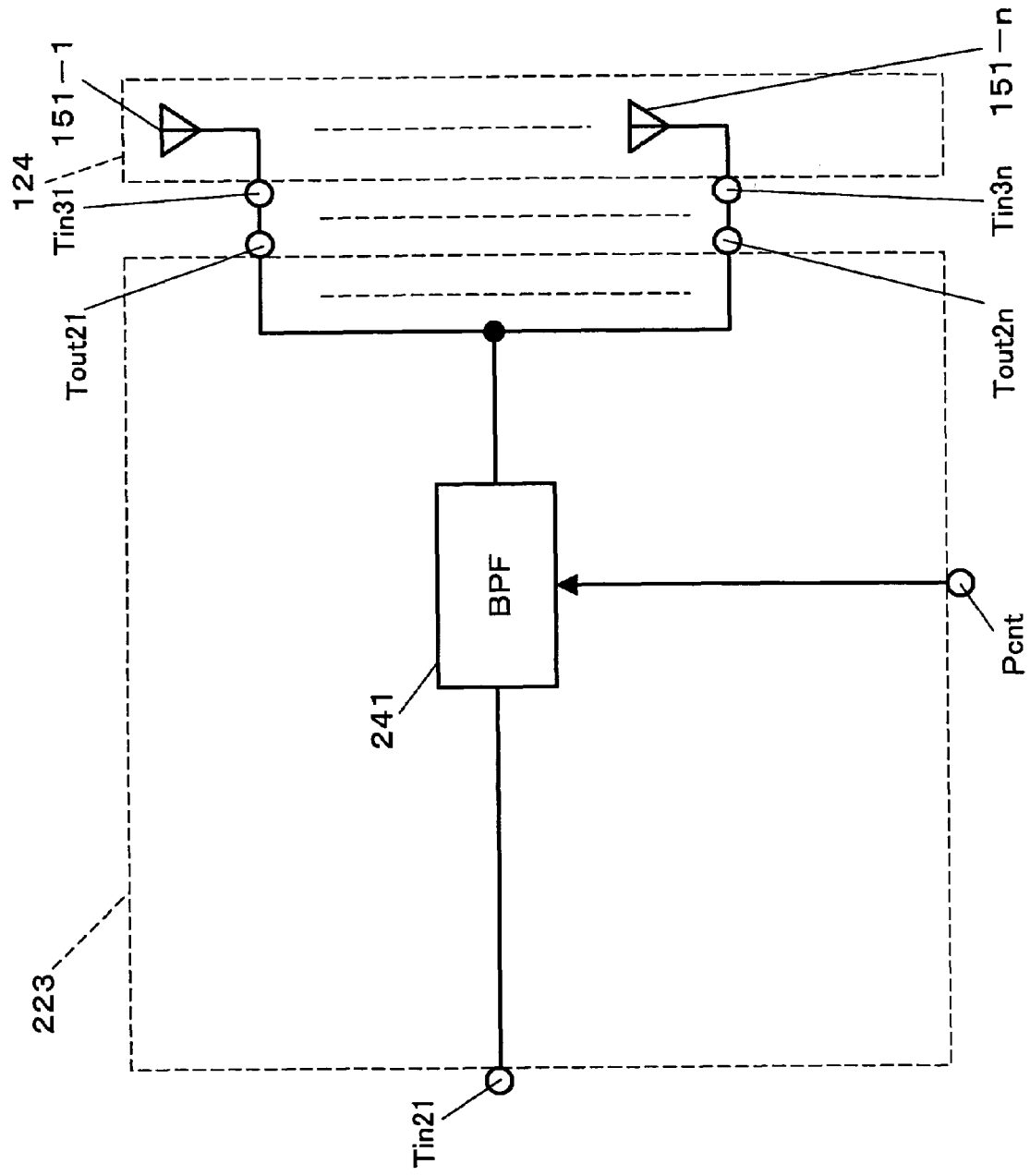
FIG. 9 is a block diagram showing a modified embodiment of the aforesaid transmitting device.

FIG. 9 is a block diagram illustrating a modified embodiment of the transmitting channel selecting section 123, wherein components identical to those in FIG. 4 are denoted by the same reference numerals and are not further described.

In this modified embodiment, a transmitting channel selecting section 223 does not include the switches SW11-SW1n nor the switches SW21-SW2n of FIG. 4. Further, the bandpass filters 141-1-141-n of FIG. 4 are replaced by a pass frequency variable filter 241.

Frequencies that the pass frequency variable filter 241 passes are included in a frequency band of a desired channel set by a control port Pcnt such that impulses are converted into a signal having frequencies of the desired channel. According to this embodiment, the transmitting channel selecting section 223 has a simplified structure.

Second Modified Embodiment

Figure 10:
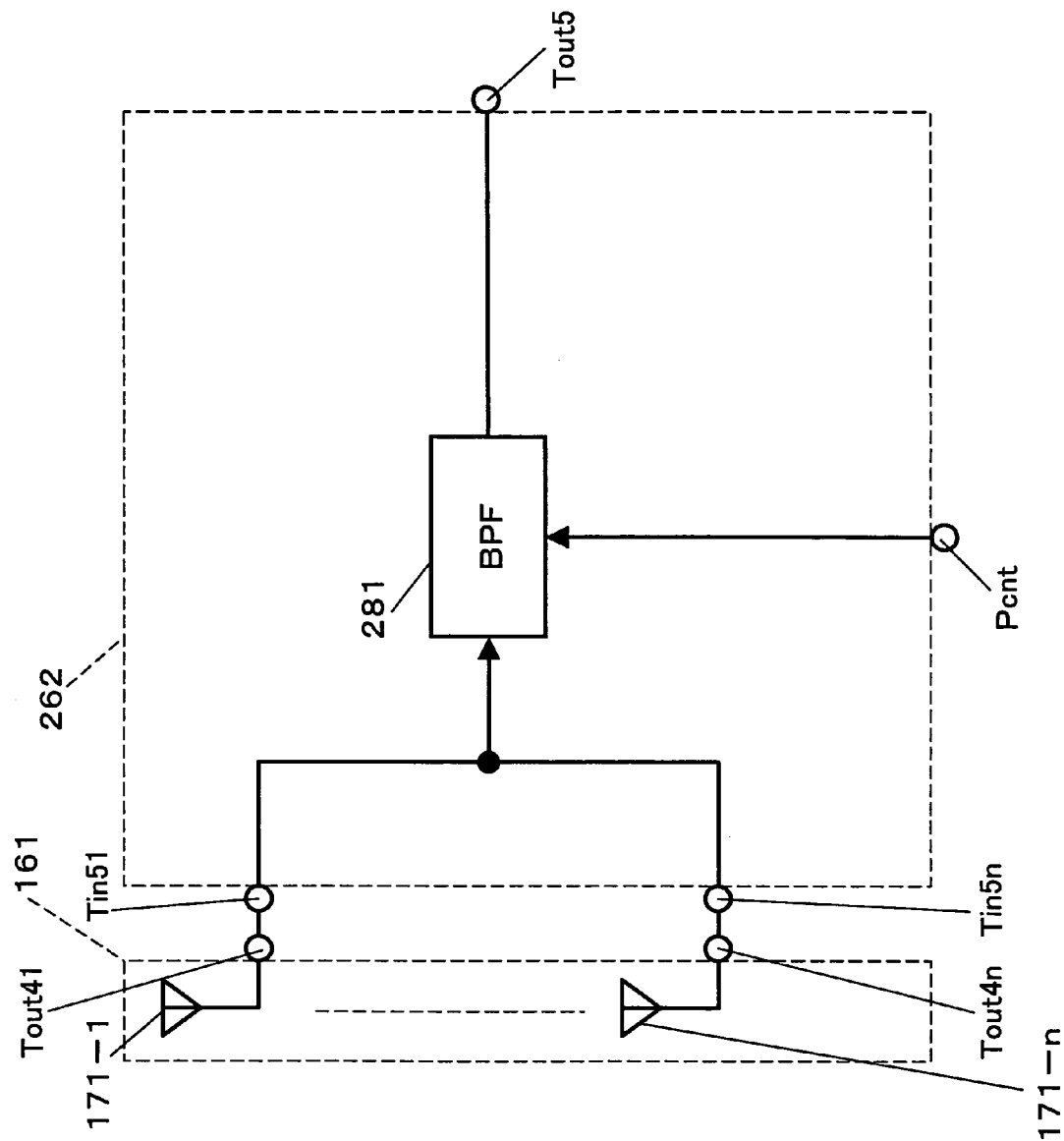
FIG. 10 is a block diagram showing a modified embodiment of the aforesaid receiving device.

FIG. 10 is a block diagram showing a modified embodiment of the receiving channel selecting section 162, wherein components identical to those in FIG. 6 are denoted by the same reference numerals and are not further described.

In this embodiment, a receiving channel selecting section 262 does not include the switches SW31-SW3n and the switches SW41-SW4n of FIG. 6. Further, the bandpass filters 181-1-181-n are replaced by a pass frequency variable filter 381.

The pass frequency of the pass frequency variable filter 281 is included in a desired frequency band set by a control port Pcnt so as to extract a desired signal from the received signals and convert the extracted signal into impulses. According to this modified embodiment, the transmitting channel selecting section 262 has a simplified structure.

Third Modified Embodiment

Figure 11:
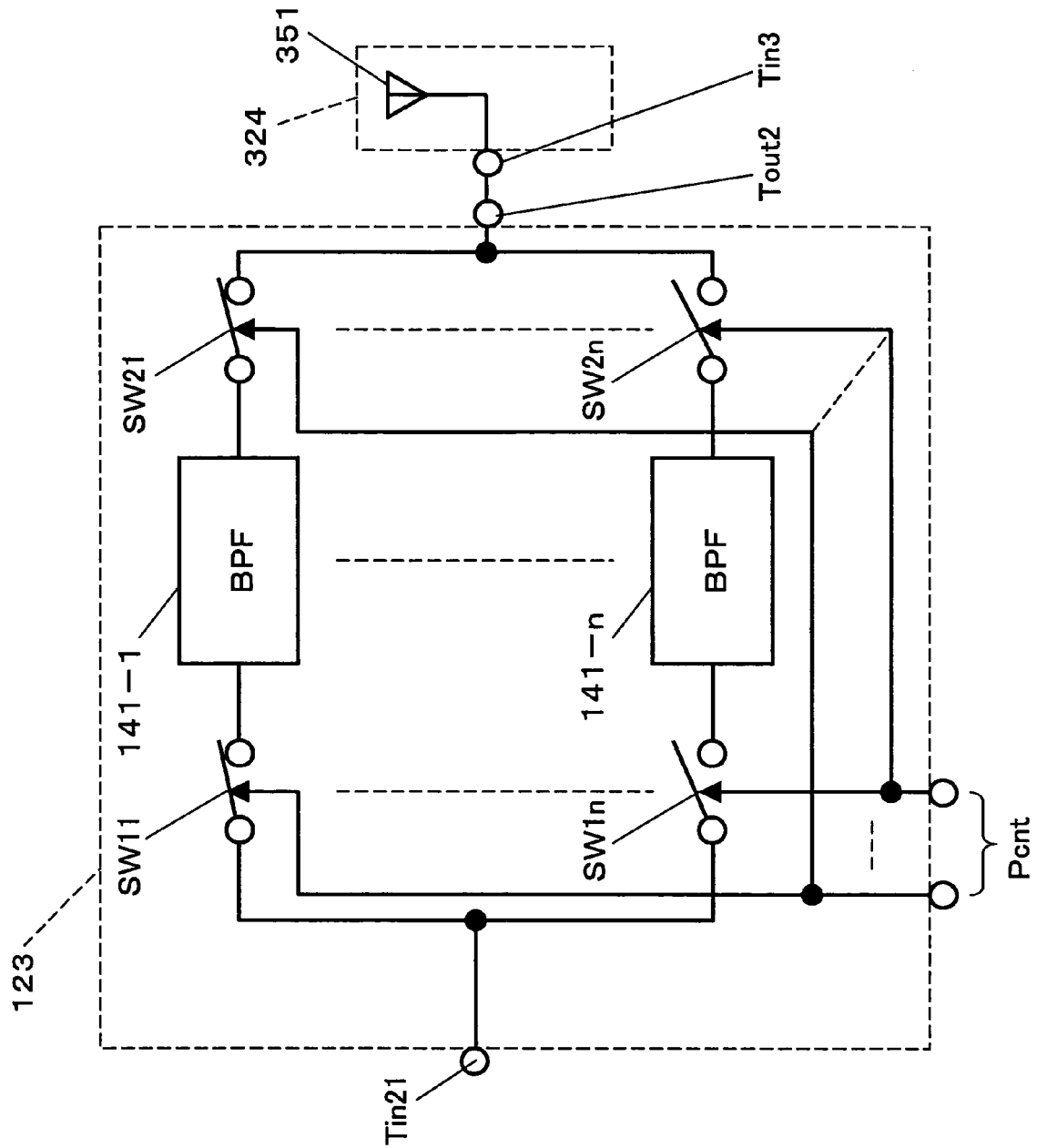
FIG. 11 is a block diagram showing a modified embodiment of the aforesaid transmitting section.

FIG. 11 is a block diagram illustrating a modified embodiment of the transmitting section 124.

In this embodiment, a transmitting section 324 includes only one antenna 315 in place of the antennas 151-1-151-*n*. The antenna 315 comprises a wideband antenna, and radiates output signals of the bandpass filters 141-1-141-*n* into the air. According to this embodiment, the transmitting channel selecting section 324 has a simplified structure.

Fourth Modified Embodiment

Figure 12:
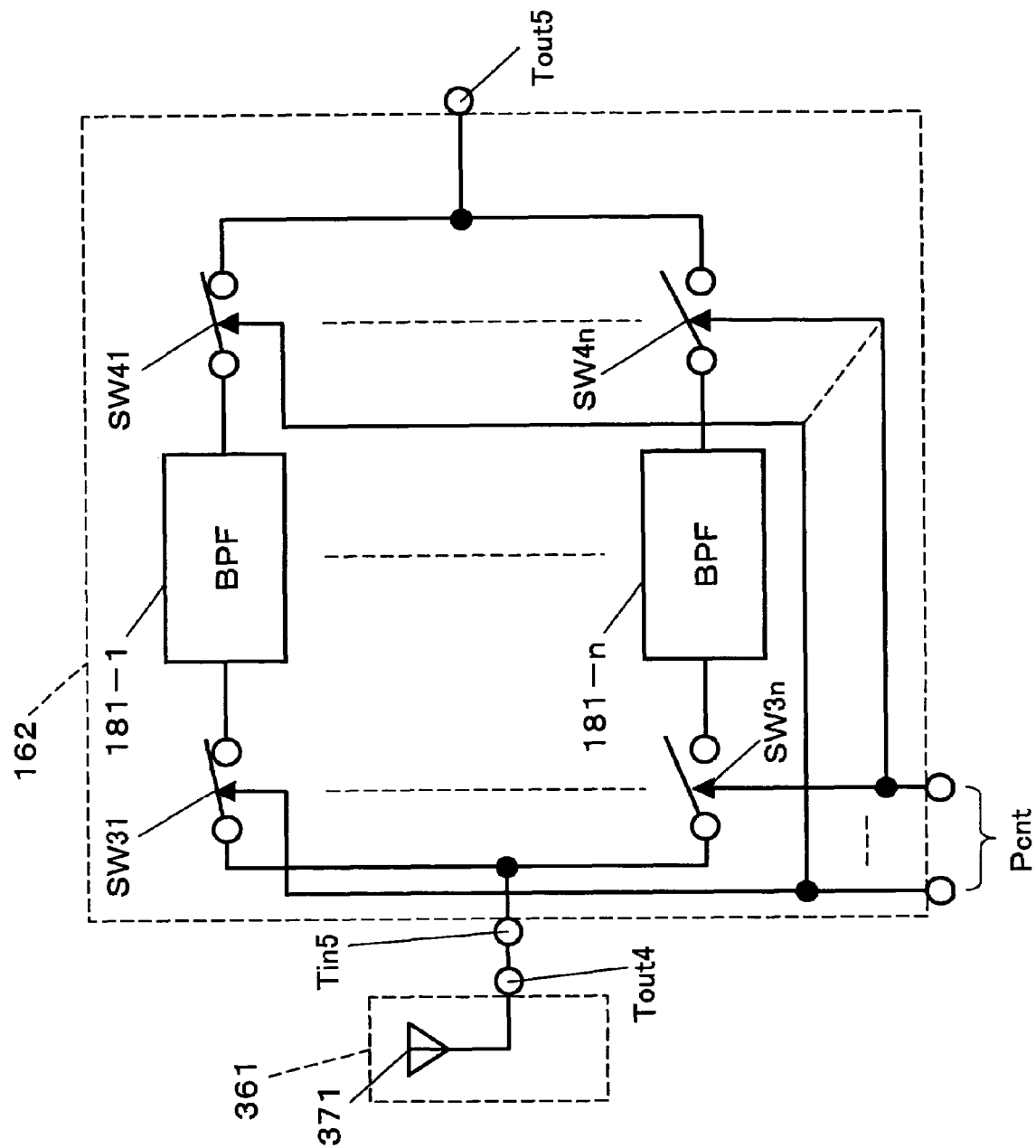
FIG. 12 is a block diagram showing a modified embodiment of the aforesaid receiving device.

FIG. 12 is a block diagram illustrating a modified embodiment of the receiving section 161.

In this embodiment, a receiving section 361 includes only one antenna 371 in place of the antennas 151-1-151-*n*. The antenna 371 comprises a wideband antenna, and receives signals across a wide band in the air. According to this embodiment, the receiving section 361 has a simplified structure.

The present application is based on Japanese Priority Application No. 2005-082141 filed on Mar. 22, 2005, with the Japanese Patent Office, the entire contents of which are hereby incorporated by reference.

What is claimed is:

1. A communication system for transmitting and receiving, comprising:
   a transmitting device including:
      a data generating unit to generate a data item by modulating a data item to be sent,
      an impulse generating unit to generate impulses corresponding to the data item generated by the data generating unit,
      a transmitting channel selecting unit to allow frequency components of the impulses corresponding to a frequency band of one of transmitting channels to pass through while the impulses attempt to pass through the transmitting channel selecting unit, the transmitting channel selecting unit including:
         a plurality of filters corresponding to the transmitting channels, each of said filters being adapted to allow a frequency component corresponding to the respective transmitting channel to pass through, and
         a filter selecting unit to select one of the filters corresponding to said one of the transmitting channels by switching on an input switch and an output switch of the selected filter synchronously with each other, and
      a transmitting unit to transmit the impulses that have passed through the transmitting channel selecting unit as signals; and
   a receiving device including:
      a receiving unit to receive the signals transmitted from the transmitting unit,
      a receiving channel selecting unit to allow the frequency components of the received signals within the frequency band corresponding to said one of the transmitting channels to pass through while the received signals attempt to pass through the receiving channel selecting unit, the receiving channel selecting unit including:
         a plurality of filters, the filters corresponding to the receiving channels, each of said filters being adapted to allow a frequency component corresponding to the respective receiving channel to pass through, and
         a filter selecting unit to select on of the filters corresponding to said one of the receiving channels by switching on an input switch and an output switch of the selected filter synchronously with each other, and
      a data restoring unit to extract the impulses from the signals that have passed through the receiving channel selecting unit so as to restore the data item sent in accordance with the extracted impulses.

2. The communication system as claimed in claim 1, wherein the impulse generating unit generates the impulses at one of a rising edge and a falling edge of pulses of the data item generated by the data generating unit.

3. The communication system as claimed in claim 1,
   wherein the transmitting channel selecting unit includes a pass frequency variable filter capable of varying a pass frequency thereof, said pass frequency being controlled to allow the frequency component corresponding to said one of the transmitting channels to pass through the pass frequency variable filter.

4. The communication system as claimed in claim 1,
   wherein the receiving channel selecting unit includes a pass frequency variable filter capable of varying a pass frequency thereof, said pass frequency being controlled to allow the frequency component corresponding to said one of the transmitting channels to pass through the pass frequency variable filter.

5. A transmitting device comprising:
   a data generating unit to generate a data item by modulating a data item to be sent;
   an impulse generating unit to generate impulses corresponding to the data item generated by the data generating unit;
   a transmitting channel selecting unit to allow frequency components of the impulses corresponding to a frequency band of one of transmitting channels to pass through while the impulses attempt to pass through the transmitting channel selecting unit; and
   a transmitting unit to transmit the impulses that have passed through the transmitting channel selecting unit as signals,
   wherein the transmitting channel selecting unit includes:
      a plurality of filters corresponding to the transmitting channels, each of said filters being adapted to allow a frequency component corresponding to the respective transmitting channel to pass through, and
      a filter selecting unit to select one of the filters corresponding to said one of the transmitting channels by switching on an input switch and an output switch of the selected filter synchronously with each other.

6. The transmitting device as claimed in claim 5, wherein the impulse generating unit generates the impulses at one of a rising edge and a falling edge of pulses of the data item generated by the data generating unit.

7. The transmitting device as claimed in claim 5,
   wherein the transmitting channel selecting unit includes a pass frequency variable filter capable of varying a pass frequency thereof, said pass frequency being controlled to allow the frequency component corresponding to said one of the transmitting channels to pass through the pass frequency variable filter.

8. A receiving device comprising:
   a receiving unit to receive signals generated from a data item to be sent;

a receiving channel selecting unit to allow frequency components of the received signals within a frequency band corresponding to one of receiving channels to pass through while the received signals attempt to pass through the receiving channel selecting unit; and a data restoring unit to extract impulses from the signals that have passed through the receiving channel selecting unit so as to restore the sent data item in accordance with the extracted impulses, wherein the receiving channel selecting unit includes:

a plurality of filters, the filters corresponding to the receiving channels, each of said filters being adapted to allow a frequency component corresponding to the respective receiving channel to pass through, and a filter selecting unit to select on of the filters corresponding to said one of the receiving channels by switching on an input switch and an output switch of the selected filter synchronously with each other.

9. The receiving device as claimed in claim 8, wherein the receiving channel selecting unit includes a pass frequency variable filter capable of varying a pass frequency thereof, said pass frequency being controlled to allow the frequency component corresponding to said one of the transmitting channels to pass through the pass frequency variable filter.

10. A communication device that performs communications, comprising:

a data generating unit to generate a data item by modulating a data item to be sent;

an impulse generating unit to generate impulses corresponding to the data item generated by the data generating unit;

a transmitting channel selecting unit to allow frequency components of the impulses corresponding to one of transmitting channels to pass through while the impulses attempt to pass through the transmitting channel selecting unit, the transmitting channel selecting unit including:

a plurality of filters corresponding to the transmitting channels, each of said filters being adapted to allow a frequency component corresponding to the respective transmitting channel to pass through, and a filter selecting unit to select one of the filters corresponding to said one of the transmitting channels by switching on an input switch and an output switch of the selected filter synchronously with each other;

a transmitting unit to transmit the impulses that have passed through the transmitting channel selecting unit as signals;

a receiving unit to receive the signals transmitted from the transmitting unit;

a receiving channel selecting unit to allow the frequency components of the received signals within the frequency band corresponding to said one of the transmitting channels to pass through while the received signals attempt to pass through the receiving channel selecting unit, the receiving channel selecting unit includes:

a plurality of filters, the filters corresponding to the receiving channels, each of said filters being adapted to allow a frequency component corresponding to the respective receiving channel to pass through, and a filter selecting unit to select on of the filters corresponding to said one of the receiving channels by switching on an input switch and an output switch of the selected filter synchronously with each other; and a data restoring unit to extract the impulses from the signals that have passed through the receiving channel selecting unit so as to restore the data item in accordance with the extracted impulses.

* * * * *